(12) United States Patent
Song

(10) Patent No.: US 9,254,974 B2
(45) Date of Patent: Feb. 9, 2016

(54) SHEET PICKUP APPARATUS AND IMAGE FORMING APPARATUS HAVING THE SAME

(71) Applicant: Samsung Electronics Co., Ltd., Suwon-si, Gyeonggi-do (KR)

(72) Inventor: Min-keun Song, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/529,437

(22) Filed: Oct. 31, 2014

(65) Prior Publication Data

US 2015/0321862 A1 Nov. 12, 2015

(30) Foreign Application Priority Data

May 12, 2014 (KR) .................. 10-2014-0056521

(51) Int. Cl.
B65H 3/06 (2006.01)
B65H 3/02 (2006.01)
F16F 1/36 (2006.01)

(52) U.S. Cl.
CPC ............... B65H 3/0684 (2013.01); B65H 3/02 (2013.01); B65H 3/0669 (2013.01); F16F 1/36 (2013.01)

(58) Field of Classification Search
CPC ..................................................... B65H 3/0684
USPC .................................................. 271/117, 118
See application file for complete search history.

(56) References Cited

U.S. PATENT DOCUMENTS 8,398,073 B2 * 3/2013 Hsu et al. ...................... 271/167

* cited by examiner

*Primary Examiner* — Michael McCullough
(74) *Attorney, Agent, or Firm* — Staas & Halsey LLP

(57) ABSTRACT

A sheet pickup apparatus and image forming apparatus are provided. The sheet pickup apparatus includes a roller support member rotatably disposed in a sheet feeding unit and comprising roller support portions connected by a hinge, a driving shaft rotatably disposed in an end of the roller support member to transmit rotational force to the roller support member, a pickup roller rotatably disposed in another end of the roller support member, a damper member disposed to absorb impact force by limiting rotation of the roller support member, and a power transmitting member disposed in the roller support member to transmit the rotational force to the pickup roller.

19 Claims, 17 Drawing Sheets

SHEET PICKUP APPARATUS AND IMAGE FORMING APPARATUS HAVING THE SAME

CROSS-REFERENCE TO RELATED APPLICATIONS

This application claims priority benefit to Korean Patent Application No. 10-2014-0056521 filed May 12, 2014 in the Korean Intellectual Property Office, the disclosure of which is incorporated herein by reference in its entirety.

BACKGROUND

1. Field

The present disclosure relates to a sheet pickup apparatus of an image forming apparatus. More particularly, the present disclosure relates to a sheet pickup apparatus having a small impact noise when picking up a print medium and an image forming apparatus having the same.

2. Description of the Related Art

Image forming apparatuses, such as laser printers, copiers, multifunctional products, facsimile machines, etc. are widely used. Such an image forming apparatus may store a plurality of print media, and performs a job such as printing and copying by picking up the print media, for example, one by one.

For example, when printing, the image forming apparatus may be required to pick up a sheet of print media loaded in a paper cassette, and to move the picked print medium to an image forming unit. For this action, swing type sheet pickup apparatuses may be used.

However, conventional swing type sheet pickup apparatuses are configured so that a pickup roller is not in contact with, but spaced apart from, the print medium before printing, and is brought into contact with the print medium when performing a pickup operation. As the printing starts, the pickup roller rotates and swings by a predetermined distance based on a predetermined point so as to come into contact with the print medium. When the pickup roller moves and is brought into contact with the print medium, the swing motion of the pickup roller is stopped, and impact noise may be generated by kinetic energy of the pickup roller.

To reduce the impact noise, a decrease in a swing speed of the pickup roller and a reduction in a swing motion distance of the pickup roller may be considered.

However, a decrease in a swing speed of the pickup roller slows a speed in which the pickup roller picks up and conveys a print medium, and not suitable for image forming apparatuses that require high speed.

In addition, because a reduction in the swing motion distance of the pickup roller requires a stack height of the print media to be constant, an additional device capable of changing the stack height of the print media is required.

Accordingly, a need to develop a sheet pickup apparatus that can decrease noise without reducing the swing speed or the swing distance is desired.

SUMMARY

According to an aspect of present disclosure the above drawbacks and other problems associated with the conventional arrangement are overcome. An aspect of the present disclosure provides a sheet pickup apparatus that can implement low noise without reducing a swing speed or a swing distance and an image forming apparatus having the same.

According to an aspect of an exemplary embodiment, a sheet pickup apparatus for an image forming apparatus is provided, which may include a roller support member rotatably disposed in a sheet feeding unit, the roller support member comprising at least two roller support portions connected by at least one hinge, a driving shaft rotatably disposed in one end of the roller support member connected in the sheet feeding unit, the driving shaft to transmit rotational force to the roller support member, a pickup roller rotatably disposed in another end of the roller support member, a damper member disposed to absorb impact force by limiting rotation of the roller support member, and a power transmitting member disposed in the roller support member, the power transmitting member to transmit the rotational force of the driving shaft to the pickup roller, wherein, when the driving shaft receives the rotational force from a driving source of the sheet feeding unit, the roller support member is rotated to hit against the damper member, and a roller support portion in which the pickup roller is disposed is rotated so that the pickup roller is brought into contact with a sheet loaded in the sheet feeding unit and picks up the sheet.

The sheet pickup apparatus may include a spring clutch or a torque clutch respectively disposed between the driving shaft and the roller support member and in the at least one hinge.

A friction force by which the driving shaft can swing the roller support member may exist between the roller support member and the driving shaft.

A friction force, which can swing a roller support portion in which the pickup roller is disposed by the rotational force transmitted from the driving shaft, may exist in a hinge connected to the roller support portion in which the pickup roller is disposed.

The sheet pickup apparatus may include a moving clutch disposed between the pickup roller and the power transmitting member.

The sheet pickup apparatus may include a restoring member to return the roller support member to an original position.

The sheet pickup apparatus may include a feed roller disposed rotatably and coaxially in the driving shaft.

A moving clutch may be disposed between the driving shaft and the feed roller.

The roller support member may include a first roller support portion having one end in which the driving shaft is rotatably disposed; and a second roller support portion having one end connected to the first roller support portion by a hinge and another end in which the pickup roller is rotatably disposed.

The damper member may be disposed in a fixing bracket extending from a frame of the sheet feeding unit.

The damper member may include rubber, sponges, and springs.

According to an aspect of an exemplary embodiment, an image forming apparatus may include a sheet feeding unit disposed in a main body and storing sheets, a sheet pickup apparatus disposed in the sheet feeding unit, the sheet pickup apparatus to pick up and supply the sheets one by one, and an image forming unit to form an image on a sheet which is picked up and supplied by the sheet pickup apparatus, wherein the sheet pickup apparatus may include a roller support member rotatably disposed in the sheet feeding unit, the roller support member comprising at least two roller support portions connected by at least one hinge; a driving shaft rotatably disposed in one end of the roller support member connected to the sheet feeding unit, the driving shaft to transmit rotational force to the roller support member, a pickup roller rotatably disposed in another end of the roller support member; a damper member disposed to absorb impact force by limiting rotation of the roller support member; and a power transmitting member disposed in the roller support member, the power transmitting member to transmit the rotational force of the driving shaft to the pickup roller, wherein, when the driving shaft receives rotational force from a driving source of the sheet feeding unit, the roller support member is rotated to hit against the damper member, and a roller support portion in which the pickup roller is disposed is rotated so that the pickup roller is brought into contact with a sheet loaded in the sheet feeding unit and picks up the sheet.

The image forming apparatus may include a spring clutch or a torque clutch respectively disposed between the driving shaft and the roller support member and in the at least one hinge.

The image forming apparatus may include a moving clutch disposed between the pickup roller and the power transmitting member.

The image forming apparatus may include a restoring member to return the roller support member to an original position.

The image forming apparatus may include a feed roller disposed rotatably and coaxially in the driving shaft.

A moving clutch may be disposed between the driving shaft and the feed roller.

Other objects, advantages and salient features of the present disclosure will become apparent from the following detailed description, which, taken in conjunction with the annexed drawings, discloses preferred embodiments.

BRIEF DESCRIPTION OF THE DRAWINGS

These and/or other aspects and advantages of the present disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION

Hereinafter, certain exemplary embodiments of the present disclosure are described in detail with reference to the accompanying drawings.

The matters defined herein, such as a detailed construction and elements thereof, are provided to assist in a comprehensive understanding of the description. An exemplary embodiment may be carried out without those defined matters. Detailed description of well-known functions or constructions may be omitted to provide a clear and concise description of exemplary embodiments. Further, the illustrated dimensions of various elements in the accompanying drawings may be increased or decreased for assisting in a comprehensive understanding of an embodiment.

A sheet pickup apparatus may be disposed in a sheet feeding unit of an image forming apparatus, picks up sheets loaded in the sheet feeding unit one by one, and conveys the picked up sheet to an image forming unit or a scanning unit. An image forming apparatus according to an exemplary embodiment may include printers, copiers, multifunctional products, facsimile machines, etc. that can form an image, e.g., a predetermined image on a print medium. Such an image forming apparatus may include two types of sheet feeding units. One type is a sheet feeding unit for supplying documents that picks up documents one by one and supplies it to a scanning unit that can scan the document. Another type is a sheet feeding apparatus for supplying print media that picks up print media one by one and supplies it to an image forming unit that can form a predetermined image. Accordingly, the sheet pickup apparatus according to an exemplary embodiment can be used in both of the two types of sheet feeding units that supply documents or print media. The term "sheets" may be defined as referring to include both documents and print media.

Figure 1:
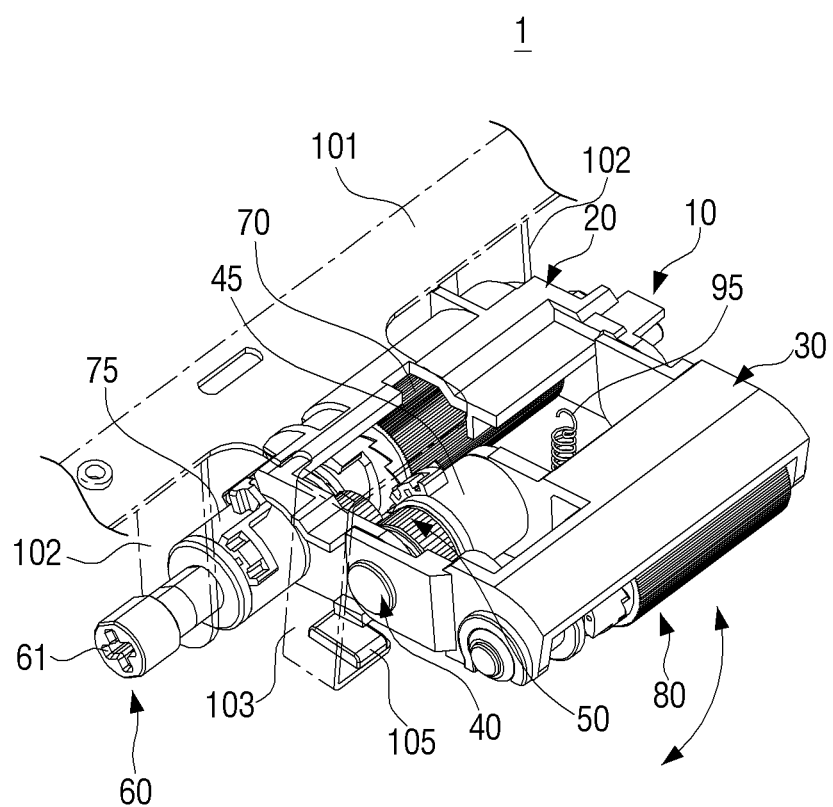
FIG. 1 is a perspective view illustrating a sheet pickup apparatus for an image forming apparatus according to an embodiment of the present disclosure.
Figure 2:
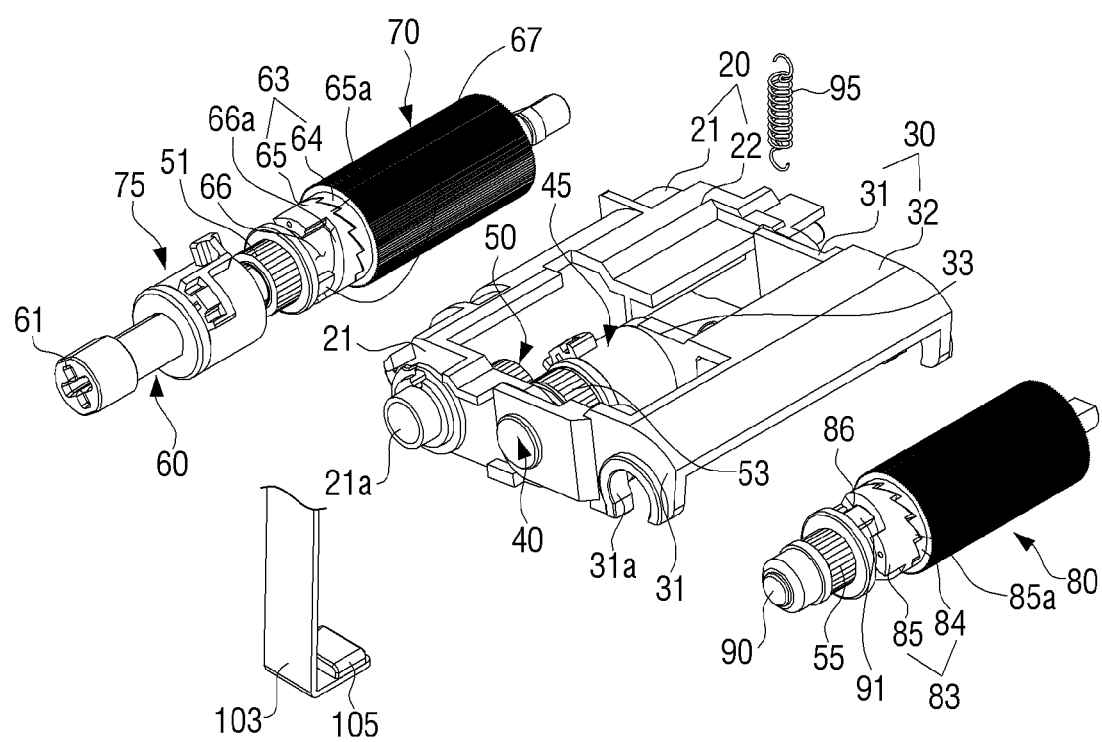
FIG. 2 is an exploded perspective view of an exemplary sheet pickup apparatus of an image forming apparatus.
Figure 3:
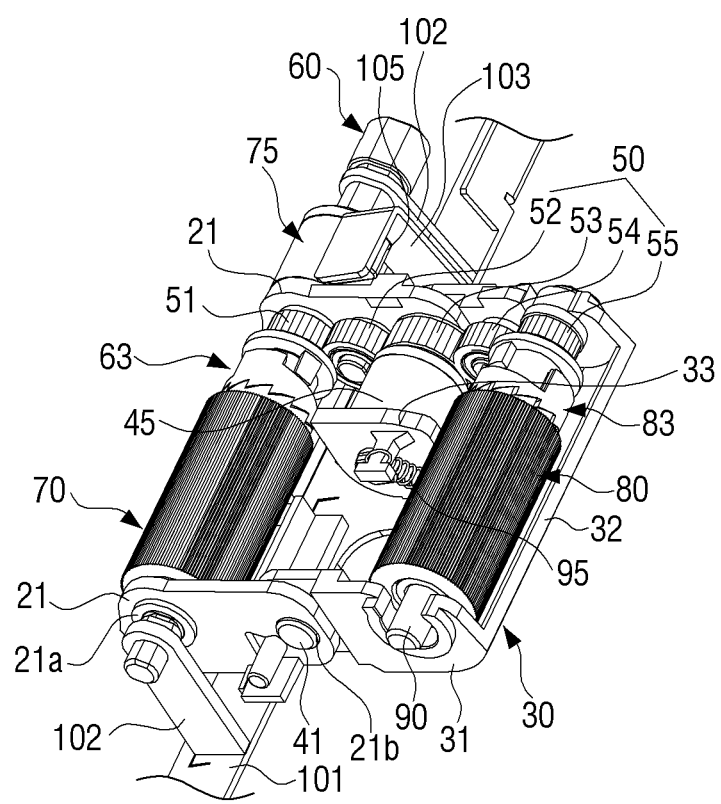
FIG. 3 is a perspective view of an exemplary sheet pickup apparatus of an image forming apparatus.

FIG. 1 is a perspective view illustrating a sheet pickup apparatus of an image forming apparatus according to an embodiment of the present disclosure, and FIG. 2 is an exploded perspective view of an exemplary sheet pickup apparatus of an image forming apparatus. FIG. 3 is a perspective view of an exemplary sheet pickup apparatus of an image forming apparatus.

As illustrated in FIGS. 1, 2, and 3, a sheet pickup apparatus 1 of an image forming apparatus according to an embodiment of the present disclosure may include a roller support member 10, a driving shaft 60, and a pickup roller 80.

The roller support member 10 rotatably supports the pickup roller 80, and allows the pickup roller 80 to be moved from an original position in which the pickup roller 80 is spaced apart from a sheet loaded in a sheet feeding unit to a contact position in which the pickup roller 80 is in contact with the sheet loaded in the sheet feeding unit.

Figure 5:
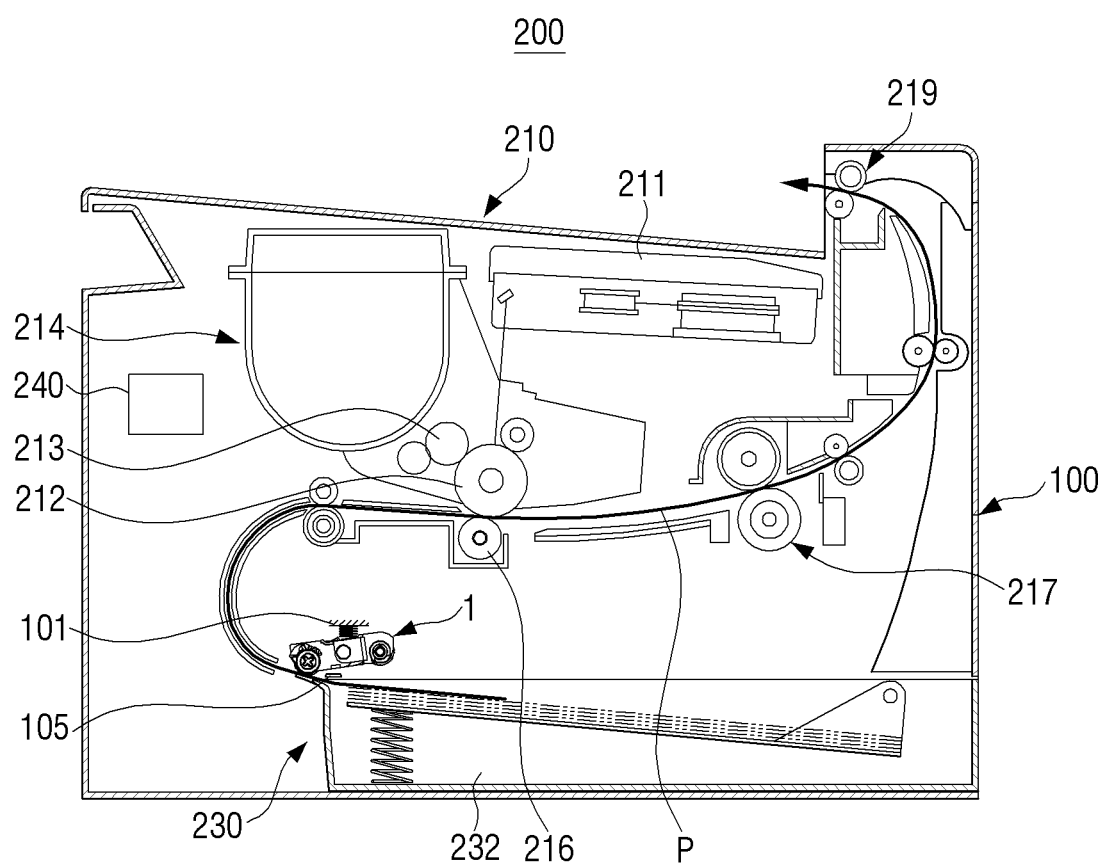
FIG. 5 is a cross-sectional view illustrating an image forming apparatus in which a sheet pickup apparatus according to an embodiment of the present disclosure is provided.

The roller support member 10 may be rotatably disposed in a frame 101 of the sheet feeding unit, and may include at least two roller support portions 20 and 30 connected by at least one hinge. The roller support member 10 includes a plurality of roller support portions 20 and 30 connected by hinges. An end roller support portion 30 of the plurality of roller support portions 20 and 30 may be configured to rotatably support the pickup roller 80, and a leading roller support portion 20 of the plurality of roller support portions 20 and 30 may be rotatably disposed in a frame 101 of the sheet feeding unit. The frame 101 of the sheet feeding unit may be a frame that is provided inside a main body 100 (see, for example. FIG. 5) of an image forming apparatus 200 (see, for example, FIG. 5) and forms a space in which a paper feed cassette 232 (see, for example, FIG. 5) can be removably accommodated.

FIGS. 1, 2, and 3 illustrate an exemplary example of the roller support member 10 including two roller support portions 20 and 30, that is, a first roller support portion 20 and a second roller support portion 30.

A driving shaft 60 may be rotatably disposed in one end of the first roller support portion 20, and opposite ends of the driving shaft 60 may be rotatably supported by a pair of support brackets 102 vertically extending from the frame 101 of the sheet feeding unit. The first roller support portion 20 includes a pair of first arms 21 that may be spaced apart by a predetermined distance from each other and a first body 22 connecting the pair of first arms 21. The pair of first arms 21 may be disposed at opposite ends of the first body 22 at right angles to the first body 22. Each of the first arms 21 may be provided with a through hole in which the driving shaft 60 is inserted. Bushes 21*a* serving as a bearing may be disposed between the driving shaft 60 and the through holes of the pair of first arms 21. Each of the pair of support brackets 102 may be provided with a hole in which the driving shaft 60 is inserted and can be rotated. A bush serving as a bearing may be disposed between the driving shaft 60 and the hole of the support bracket 102.

An end of the driving shaft 60 includes a connecting portion 61 extending outside the support bracket 102. The connecting portion 61 may be connected to a shaft of a motor (not illustrated) or a power transmitting mechanism (not illustrated) to transmit power from a motor (not illustrated) that may be used for an other purpose(s). The power transmitting mechanism may be configured of anyone of a gear transmitting structure, a belt transmitting structure, and a mixed gear and belt transmitting structure. The power transmitting mechanism may be a conventional power transmitting mechanism, and therefore, a detailed description thereof will be omitted.

A feed roller 70 may be coaxially disposed in the driving shaft 60. Accordingly, as the driving shaft 60 is rotated, the feed roller 70 can be rotated. The feed roller 70 may be configured to rotate integrally with the driving shaft 60. According to an embodiment, when the driving shaft 60 is rotated, the feed roller 70 is rotated integrally with the driving shaft 60, but when the driving shaft 60 is at a standstill, if a force is applied to the feed roller 70 in a sheet feed direction, only the feed roller 70 can be freely rotated. When a sheet is jammed in the feed roller 70, this configuration facilitates the removal of the jammed sheet. A first moving clutch 63 may be disposed between the driving shaft 60 and the feed roller 70.

As illustrated in FIG. 2, the first moving clutch 63 includes a fixed sawtooth wheel 64 and a moving ring 65. The fixed sawtooth wheel 64 may be disposed on a side surface of the feed roller 70 and includes a plurality of sawteeth formed in a longitudinal direction of the feed roller 70. The moving ring 65 may be disposed in a side of the feed roller 70 and includes a moving sawtooth wheel 65*a* which can mesh with the fixed sawtooth wheel 64. The feed roller 70 and the moving ring 65 may be disposed to rotate with respect to the driving shaft 60. The driving shaft 60 may be provided with an operating projection 67 which allows the moving ring 65 to be moved in the longitudinal direction of the driving shaft 60. The moving ring 65 may be formed in a hollow ring shape. The moving sawtooth wheel 65*a* may be formed on a side end of the moving ring 65. An operating groove 66 may be formed on the outer circumferential surface of the moving ring 65. The operating groove 66 may be formed to include an inclined surface 66*a* inclined along the circumference of the moving ring 65 so as to form a substantially trapezoidal shape. When the operating projection 67 of the driving shaft 60 is placed at a shallow position of the operating groove 66, the moving sawtooth wheel 65*a* of the moving ring 65 meshes with the fixed sawtooth wheel 64 of the feed roller 70. Accordingly, when the driving shaft 60 is rotated, the feed roller 70 may be rotated along with the driving shaft 60.

When a force is applied to the feed roller 70 in an inclined direction of the fixed sawtooth wheel 64 (see, for example, a direction of an arrow D in FIG. 4A) in a state in which the driving shaft 60 is stopped, the feed roller 70 may be rotated so that the moving ring 65 with the moving sawtooth wheel 65*a* is pushed along the driving shaft 60 in a side-direction (see, for example, a direction of an arrow E in FIG. 4A) by the fixed sawtooth wheel 64. As a result, the operating projection 67 may be placed at a deep position of the operating groove 66 of the moving ring 65 so that the moving sawtooth wheel 65*a* is loosed from the fixed sawtooth wheel 64. Therefore, the fixed sawtooth wheel 64 of the feed roller 70 does not interfere with the moving sawtooth wheel 65*a* of the moving ring 65. Accordingly, because the feed roller 70 can be rotated in a state in which the driving shaft 60 is at a stationary, a user can easily remove a sheet jammed in the feed roller 70.

The other end of the first roller support portion 20 may be hinge-connected to an end of the second roller support portion 30. Accordingly, the second roller support portion 30 can rotate by a predetermined angle with respect to the first roller support portion 20.

The second roller support portion 30 may be formed to rotatably support the pickup roller 80. The second roller support portion 30 includes a pair of second arms 31 that may be spaced apart a predetermined distance from each other to support the pickup roller 80 and a second body 32 connecting the pair of second arms 31. The pair of second arms 31 may be disposed at opposite ends of the second body 32 at right angles to the second body 32. Each of the second arms 31 may be provided with a through hole 31*a* in which a shaft 90 of the pickup roller 80 is inserted. A bush 21*a* serving as a bearing may be disposed between the pickup roller shaft 90 and the through hole 31*a* of each of the pair of second arms 31.

The through hole 31*a* may be formed in an end of the second arm 31, and the other end of the second arm 32 may be formed to be hinge-connected with the first arm 21 of the first roller support portion 20. According to an exemplary embodiment, a support arm 33 extending from the second body 32 is formed between the pair of second arms 31. A hinge shaft 40 may be disposed between the support arm 33 and the second arm 31. A hinge projection 41 may be disposed on the other of the pair of second arms 31. Accordingly, if the hinge projection 41 of the second arm 31 of the second roller support portion 30 is inserted into the hinge hole 21*b* formed in the first arm 21 of the first roller support portion 20 and the hinge shaft 40 is inserted into the hinge holes of the first arm 21 and the second arms 31 which are aligned with each other, the first roller support portion 20 and the second roller support portion 30 may be hinge-connected with each other, thereby capable of rotating with respect to each other.

A power transmitting member 50 to transmit a rotational force of the driving shaft 60 to the pickup roller 80 may be disposed in the roller support member 10. A plurality of gears 51, 52, 53, 54, and 55 may be disposed to mesh with each other in one of the pair of first arms 21 of the first roller support portion 20 and one of the pair of second arms 31 of the second roller support portion 30. As illustrated in FIG. 3, according to an exemplary embodiment, the power transmitting member 50 may be configured of a gear train including five gears 51, 52, 53, 54, and 55. One of the five gears 51, 52, 53, 54, and 55 configuring the power transmitting member 50 may be disposed in the hinge shaft 40. The power transmitting member 50 may be configured to transmit a rotational force so that the pickup roller 80 can rotate at the same rotational speed as that of the driving shaft 60. Accordingly, when the driving shaft 60 is rotated, the pickup roller 80 may be rotated at the same speed in the same direction as the driving shaft 60. In a case in which the driving shaft 60 is provided with the feed roller 70, the pickup roller 80 and the feed roller 70 may convey a sheet at the same rotational speed. According to an exemplary embodiment, the power transmitting member 50 may be configured of gears; however, the power transmitting member 50 is not limited thereto. The power transmitting member 50 may be configured in a variety of forms to transmit the rotational force of the driving shaft 60 to the pickup roller 80. For example, the power transmitting member 50 may be configured in a belt transmitting structure or in a mixed belt and gear transmitting structure.

The pickup roller 80 may be configured so that when the pickup roller shaft 90 rotates, the pickup roller 80 is rotated integrally with the pickup roller shaft 90. When the pickup roller shaft 90 is stationary, if a force is applied to the pickup roller 80 in a sheet feeding direction (see, for example, arrow D in FIG. 4A), only the pickup roller 80 can be freely rotated. When a sheet is jammed in the pickup roller 80, this configuration facilitates removal of the jammed sheet. A second moving clutch 83 may be disposed between the pickup roller shaft 90 and the pickup roller 80.

The second moving clutch 83 includes a fixed sawtooth wheel 84 and a moving ring 85. The fixed sawtooth wheel 84 may be disposed on a side surface of the pickup roller 80 and includes a plurality of sawteeth formed in a longitudinal direction of the pickup roller 80. The moving ring 85 may be disposed in a side of the pickup roller 80 and includes a moving sawtooth wheel 85a which can mesh with the fixed sawtooth wheel 84. The pickup roller 80 and the moving ring 65 may be disposed to rotate with respect to the pickup roller shaft 90. The pickup roller shaft 90 is provided with an operating projection 91 which allows the moving ring 85 to be moved in the longitudinal direction of the pickup roller shaft 90. The moving ring 85 may be formed in a hollow ring shape. The moving sawtooth wheel 85a may be formed on a side end of the moving ring 85. An operating groove 86 may be formed on the outer circumferential surface of the moving ring 85. The operating groove 86 may be formed to include an inclined surface inclined along the circumference of the moving ring 85 so as to form a substantially trapezoidal shape. When the operating projection 91 of the pickup roller shaft 90 is placed at a shallow position t of the operating groove 86, the moving sawtooth wheel 85a of the moving ring 85 meshes with the fixed sawtooth wheel 84 of the pickup roller 80. Accordingly, when the pickup roller shaft 90 is rotated by the driving shaft 60, the pickup roller 80 may be rotated along with the pickup roller shaft 90.

Figure 4A:
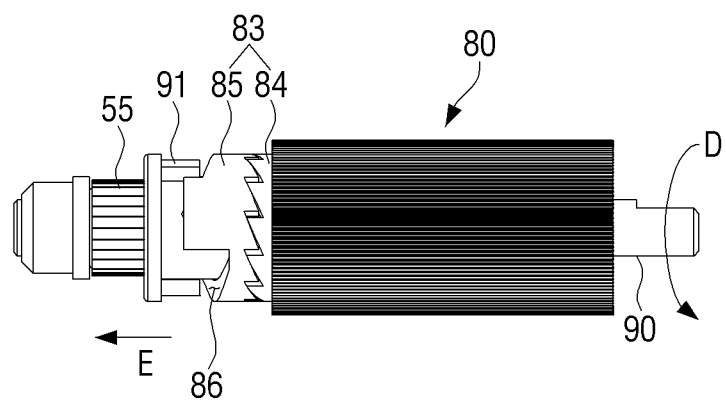
FIG. 4A is a view illustrating an exemplary state of a moving clutch when a pickup roller of a sheet pickup apparatus of an image forming apparatus supplies a print medium.
Figure 4B:
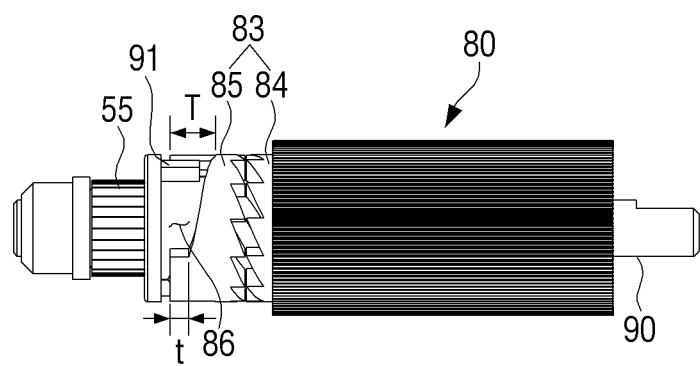
FIG. 4B is a view illustrating an exemplary state of a moving clutch of a pickup roller when a jammed print medium is removed from the sheet pickup apparatus of an image forming apparatus.

When a force is applied to the pickup roller 80 in an inclined direction of the fixed sawtooth wheel 84 (see, for example, a direction of an arrow D in FIG. 4A) in a state in which the pickup roller shaft 90 is stopped, the pickup roller 80 may be rotated so that the moving sawtooth wheel 85a is pushed by the fixed sawtooth wheel 8 so that the moving ring 85 is pushed along the pickup roller shaft 90 in a side-direction (see, for example, a direction of an arrow E in FIG. 4A). As a result, the operating projection 91 may be placed at a deep position T of the operating groove 86 of the moving ring 85 so that the moving sawtooth wheel 85a of the moving ring 85 is spaced apart from the fixed sawtooth wheel 84 of the pickup roller 80. Therefore, in a state in which the pickup roller shaft 90 is at a stationary, the pickup roller 80 does not interfere with the moving sawtooth wheel 85a of the moving ring 85 and can be rotated so that a user can easily remove a sheet jammed in the pickup roller 80. The second moving clutch 83 disposed in the pickup roller 80 may have a same structure and operation as those of the first moving clutch 63 of the feed roller 70.

A damper member 105 may be disposed in one side of the roller support member 10 so as to limit rotation of the first roller support portion 20 and absorb impact force thereof. The damper member 105 may be disposed in a fixing bracket 103 extending from the frame 101 of the sheet feeding unit. According to an exemplary embodiment, the fixing bracket 103 extends from the frame 101 of the sheet feeding unit in which the driving shaft 60 of the roller support member 10 is disposed. However, the fixing bracket 103 may be disposed anywhere where the fixing bracket 103 can absorb impact of the roller support member 10 by supporting the damper member 105, but does not disturb conveying of a sheet. The damper member 105 may be formed of a material that can absorb impact force, such as rubbers, sponges, springs, etc.

The first roller support portion 20 and second roller support portion 30 of the roller support member 10 may be configured so that the roller support member 10 is rotated along with the driving shaft 60. If the first roller support portion 20 is caught in the damper member 105 while the roller support member 10 is swinging based on a rotation center C1 of the driving shaft 60, the second roller support portion 30 may be swung based on the hinge shaft 40 between the first roller support portion 20 and the second roller support portion 30 so that the pickup roller 80 rotatably supported by the second roller support portion 30 is brought into contact with a sheet stocked in the sheet feeding unit.

The first roller support portion 20 and driving shaft 60 may be formed so that a predetermined friction force is generated between the first roller support portion 20 and the driving shaft 60. Alternatively, a spring clutch or a torque clutch may be disposed between the first roller support portion 20 and the driving shaft 60. Similarly, the first roller support portion 20, the second roller support portions 30, and the hinge shaft 40 may be formed so that a predetermined friction force is generated in hinge shaft 40 connecting the first roller support portion 20 and second roller support portion 30. Alternatively, a spring clutch or a torque clutch may be disposed in the hinge shaft 40 connecting the first roller support portion 20 and the second roller support portion 30. According to an exemplary embodiment, spring clutches 45 and 75 may be used between the driving shaft 60 and the first roller support portion 20 and in the hinge shaft 40 between the first roller support portion 20 and the second roller support portion 30. A case in which first spring clutch 75 and second spring clutch 45 are used between the driving shaft 60 and the first roller support portion 20 and in the hinge shaft 40 between first roller support portion 20 and the second roller support portion 30 is explained as one example.

The first spring clutch 75 may be disposed between the driving shaft 60 and the first roller support portion 20. If a force under a predetermined amount is applied to the first roller support portion 20, the first spring clutch 75 allows the first roller support portion 20 to be rotated along with the driving shaft 60, and, if a force above the predetermined amount is applied to the first roller support portion 20, the first spring clutch 75 allows the driving shaft 60 to be slipped with respect to the first roller support portion 20 so as to rotate relatively with respect to the first roller support portion 20. The predetermined amount of force being applied to the first spring clutch 75 may be determined based on a load being applied to the driving shaft 60 when the roller support member 10 is completely assembled, namely, when all the first roller support portion 20, the second roller support portion 30, the pickup roller 80, a restoring member 95, etc. are assembled. Accordingly, when the roller support member 10 is not caught in the damper member 105, if the driving shaft 60 rotates, the roller support member 10 may also be rotated along with the driving shaft 60 due to the first spring clutch 75, and if the first roller support portion 20 of the roller support member 10 is caught in the damper member 105, the driving shaft 60 rotates relatively with respect to the first roller support portion 20 due to the first spring clutch 75 so that first roller support portion 20 is not rotated. If the driving shaft 60 rotates relatively, the power transmitting member 50, that is, a gear train is rotated by a first gear 51 fixed to the driving shaft 60.

The second spring clutch 45 may be disposed in the hinge shaft 40 between the first roller support portion 20 and the second roller support portion 30. If a force under a predetermined amount is applied to the second roller support portion 30, the second spring clutch 45 allows the second roller support portion 30 to be rotated along with the hinge shaft 40 by a rotational force transmitted through the power transmitting member 50. If a force above the predetermined amount is applied to the second roller support portion 30, the second spring clutch 45 allows the hinge shaft 40 to be slipped with respect to the second roller support portion 30 so as to be rotated relatively with respect to the second roller support portion 30. The predetermined amount of force being applied to the second spring clutch 45 may be determined based on a load being applied to the hinge shaft 40 when the pickup roller 80 is assembled in the second roller support portion 30. Accordingly, when the pickup roller 80 of the second roller support portion 30 is not in contact with a sheet, if the hinge shaft 40 rotates, the second roller support portion 30 is also rotated along with the hinge shaft 40 due to the second spring clutch 45. After the second roller support portion 30 is brought into contact with the sheet, the hinge shaft 40 rotates relatively with respect to the second roller support portion 30 due to the second spring clutch 45 so that the second roller support portion 30 is not rotated. If the hinge shaft 40 is rotated relatively with respect to the second roller support portion 30, the pickup roller 80 is rotated through a fourth gear 54 and a fifth gear 55 of the gear train 50 by the third gear 53 fixed to the hinge shaft 40.

When the driving shaft 60 stops rotating, that is, when the rotational force of a drive source (not illustrated) transmitted to the driving shaft 60 is blocked, the roller support member 10 may be returned to an original position due to the restoring member 95. One end of the restoring member 95 may be fixed to the second body 32 of the second roller support portion 30, and the other end of the restoring member 95 may be fixed to the frame 101 of the sheet feeding unit or a portion of the main body 100 above the sheet pickup apparatus 1. Accordingly, if the rotational force transmitted to the driving shaft 60 is blocked in a state in which the pickup roller 80 is in contact with the sheet, the roller support member 10 may be returned to the original position which is spaced apart a predetermined distance from the sheet by an elastic force of the restoring member 95. The restoring member 95 may be formed of a tension coil spring.

The spring clutches 75 and 45 may be used in order that, when a load is not applied to the roller support member 10, the roller support member 10 may be allowed to be swung When a predetermined load is applied to the roller support member 10, a rotational force may be allowed to be transmitted to the power transmitting member 50 disposed in the roller support member 10. However, a torque clutch may be used instead of the spring clutches 75 and 45.

According to an exemplary embodiment, the spring clutches 75 and 45 or torque clutches are not used, but friction forces between the driving shaft 60 and the first roller support portion 20 and between the first roller support portion 20 and the second roller support portion 30 may be used.

As the driving shaft 60 receives power from the driving source and starts to rotate, the first roller support portion 20 and the second roller support portion 30, that is, the roller support member 10 is rotated along with the driving shaft 60 so as to perform a swing motion. When the first roller support portion 20 receives a predetermined force during the swing motion, namely, when the first roller support portion 20 is hit against the damper member 105, the swing of the first roller support portion 20 based on the driving shaft 60 is stopped and the driving shaft 60 rotates relatively with respect to the first roller support portion 20. In other words, in a state in which the first roller support portion 20 is stopped, the driving shaft 60 rotates, thereby transmitting a rotational force to the power transmitting member 50. In order to allow the driving shaft 60 and the first roller support portion 20 to perform this operation, the driving shaft 60 and the first roller support portion 20 may be formed so that a predetermined amount of friction force acts between the driving shaft 60 and the first roller support portion 20. The amount of the friction force may be determined so that when the driving shaft 60 rotates by receiving power from the driving source, the driving shaft 60 overcomes the elastic force of the restoring member 95 and thus rotates along with the first roller support portion 20 and the second roller support portion 30. Accordingly, if the first roller support portion 20 is hit against the damper member 105, a force over the friction force is applied between the driving shaft 60 and first roller support portion 20 so that the first roller support portion 20 maintains the stopped state and the driving shaft 60 is slipped and rotated with respect to the first roller support portion 20, thereby transmitting a rotational force to the power transmitting member 50.

When the rotational force is transmitted to the power transmitting member 50, the rotational force may be transmitted to the third gear 53 disposed in the hinge shaft 40 connecting the first roller support portion 20 and the second roller support portion 30. If the rotational force is transmitted to the third gear 53, the second roller support portion 30 may be swung integrally with the hinge shaft 40 based on the hinge shaft 40. During the swing motion, if a predetermined force is applied to the second roller support portion 30, that is, if the pickup roller 80 disposed in the second roller support portion 30 is hit against the sheet, the swing motion of the second roller support portion 30 based on the hinge shaft 40 may be stopped, and then the hinge shaft 40 is rotated relatively with respect to the second roller support portion 30. In other words, in a state in which the second roller support portion 30 is stopped, the hinge shaft 40 rotates so as to transmit the rotational force to the pickup roller 80 via the fourth gear 54 and fifth gear 55. In order to allow the hinge shaft 40 and the second roller support portion 30 to perform this operation, the hinge shaft 40 and the second roller support portion 30 may be formed so that a predetermined amount of friction force acts between the hinge shaft 40 and the second roller support portion 30. The amount of the friction force may be determined so that when the hinge shaft 40 rotates by receiving a rotational force from the driving shaft 60, the hinge shaft 40 overcomes the elastic force of the restoring member 95 and thus rotates along with the second roller support portion 30. Accordingly, if the second roller support portion 20 is hit against the sheet, a force over the predetermined friction force is applied between the hinge shaft 40 and second roller support portion 30 so that the second roller support portion 30 maintains the stopped state and the hinge shaft 40 may be slipped and rotated with respect to the second roller support portion 30, thereby transmitting the rotational force to the pickup roller 80.

The sheet pickup apparatus 1 according to an embodiment of the present disclosure may be used in a sheet feeding unit of an image forming apparatus. The sheet pickup apparatus 1 may be used in a paper feed cassette type of a sheet feeding unit that stores a predetermined sheet of print media and picks up them one by one to supply it to an image forming unit The sheet pickup apparatus 1 may be used in an auto document feeder which picks up a predetermined sheet of documents one by one and supplies it to a scanning unit.

An exemplary case in which the sheet pickup apparatus according to an embodiment of the present disclosure is disposed in a paper feed cassette of an image forming apparatus is described with reference to FIGS. 5 to 6D.

FIG. 5 illustrates an image forming apparatus in which a sheet pickup apparatus according to an embodiment of the present disclosure is provided. FIGS. 6A through 6D are cross-sectional views sequentially illustrating operations of the sheet pickup apparatus disposed in a paper feed cassette, a sheet feeding unit of an image forming apparatus.

As illustrated in FIG. 5, the image forming apparatus 200 may include a main body 100, an image forming unit 210, and a sheet feeding unit 230.

The main body 100 forms an outer appearance of the image forming apparatus 200, and accommodates the image forming unit 210 and the sheet feeding unit 230 therein.

The image forming unit 210 may be configured to form images corresponding to printing data on a print medium P being supplied from the sheet feeding unit 230. The image forming unit 210 may include an exposure unit 211, a developing unit 214, a transfer roller 216, a fixing unit 217, and a paper discharging unit 219. The exposure unit 211 forms an electrostatic latent image on an image carrier 212 of the developing unit 214 by emitting light corresponding to the printing data. The developing unit 214 includes the image carrier 31 and a developing roller 213, and supplies developer to the image carrier 31 using the developing roller 213, thereby forming the electrostatic latent image into a developer image. The transfer roller 216 may be disposed to face the image carrier 212 of the developing unit 214, and allows the developer image to be transferred onto the print medium P passing through between the transfer roller 216 and the image carrier 212. The fixing unit 217 fixes the developer image transferred from the transfer roller 216 onto the print medium P by applying heat and pressure to the print medium P. The paper discharging unit 219 discharges the fixed print medium P outside the main body 100.

The sheet feeding unit 230 stores a predetermined sheet of print media P, and picks up the print media P one by one to feed the print medium P to the developing unit according to a command of a controller 240. The sheet feeding unit 230 may include a paper feed cassette 232 to store a predetermined sheet of print media P and a sheet pickup apparatus 1 to pick up and feed the print media P one by one.

The sheet pickup apparatus 1 may be rotatably disposed in a leading end of the paper feed cassette 232. The sheet pickup apparatus 1 may be disposed so that the driving shaft 60 is rotatably supported by the support bracket 102 expending from the frame 101 of the sheet feeding unit 230 and the pickup roller 80 can move between an original position in which the pickup roller 80 is spaced apart from the uppermost print medium P in the paper feed cassette 232 and a feeding position in which the pickup roller 80 is in contact with the uppermost print medium P.

The sheet pickup apparatus 1 includes a roller support member 10 including a first roller support portion 20 and a second roller support portion 30, a driving shaft 60 disposed in one end of the first roller support portion 20, a first spring clutch 75 disposed between the first roller support portion 20 and the driving shaft 60, a feed roller 70 disposed in the driving shaft 60, the second roller support portion 30 hinge-connected with the first roller support portion 20, a pickup roller 80 disposed in one end of the second roller support portion 30, a second spring clutch 45 disposed in a hinge shaft 40 connecting the first roller support portion 20 and the second roller support portion 30, and a power transmitting member 50 which is disposed on one side of the first roller support portion 20 and second roller support portion 30 and transmits a rotational force of the driving shaft 60 to the pickup roller 80. The sheet pickup apparatus 1 includes a damper member 105 that can limit rotation of the first roller support portion 20 and can absorb impact force caused by the first roller support portion 20. The damper member 105 may be disposed in a fixing bracket 103 extending from the frame 101 of the sheet feeding unit 230 toward the paper feed cassette 232.

Hereinafter, an exemplary operation of the sheet pickup apparatus 1 disposed in an sheet feeding unit 230 of an image forming apparatus 200 is explained in detail with reference to FIGS. 6A through 6D.

Figure 6A:
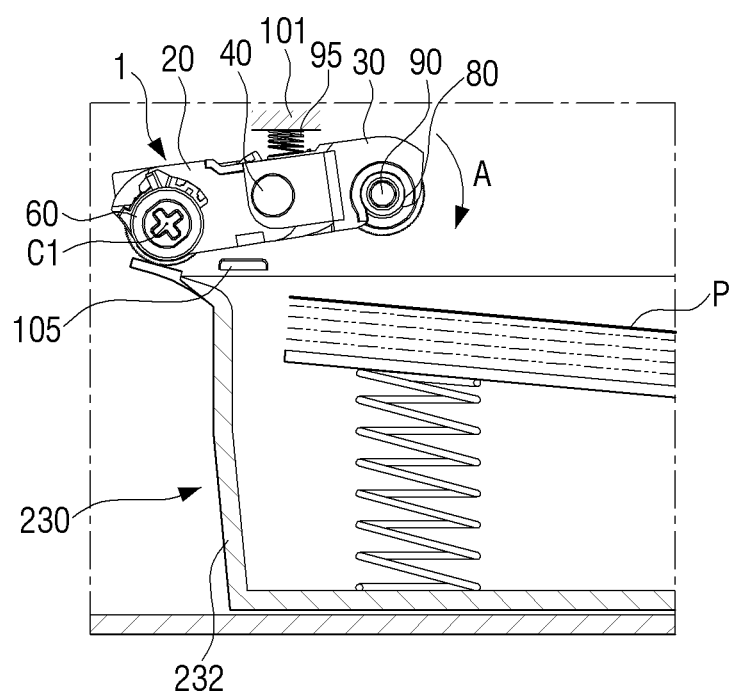
FIG. 6A is a cross-sectional view illustrating an exemplary case in which a sheet pickup apparatus is in a standby state.

In an exemplary initial state, the sheet pickup apparatus 1 may be placed at the original position in which the pickup roller 80 is spaced apart from the print medium P as illustrated, for example, in FIG. 6A.

When printing is started in this state, the driving shaft 60 may be rotated by a rotational force transmitted from a drive source (not illustrated). When the driving shaft 60 is rotated in a clockwise direction, the roller support member 10, that is, the first roller support portion 20 and the second roller support portion 30 may be swung integrally with the driving shaft 60 based on a rotational center C1 of the driving shaft 60 in a clockwise direction (arrow A).

Figure 6B:
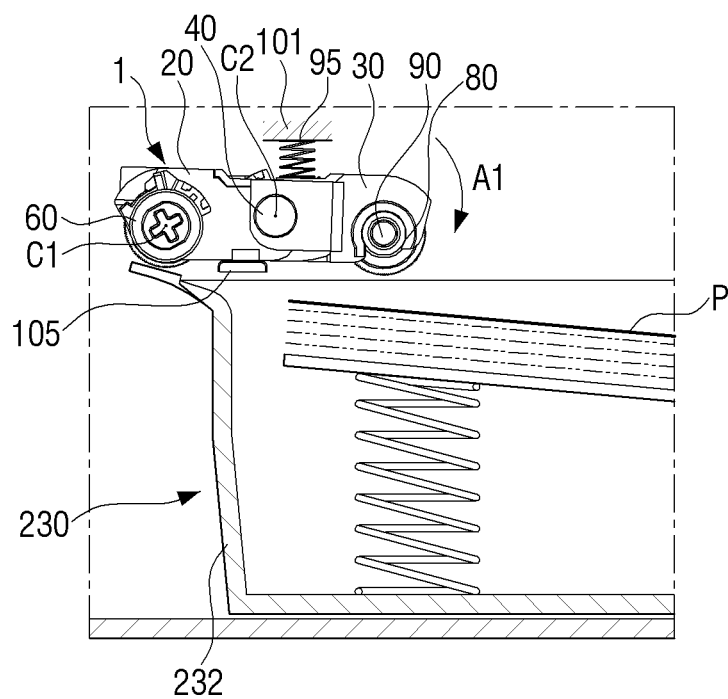
FIG. 6B is a cross-sectional view illustrating an exemplary state in which a roller support portion of the sheet pickup apparatus is hit against a damper member.

When the roller support member 10 is rotated by a predetermined angle, as illustrated, for example, in FIG. 6B, a bottom surface of the first roller support portion 20 of the roller support member 10 may be hit against the damper member 105. When the first roller support portion 20 is hit against the damper member 105, a load, for example, greater than a reference load, may be applied to the first spring clutch 75 so that the driving shaft 60 slips with respect to the first roller support portion 20. Accordingly, in a state which the first roller support portion 20 is hit against the damper member 105, the first roller support portion 20 may be stopped and only the driving shaft 60 rotates. When the driving shaft 60 rotates, the first gear 51 of the power transmitting member 50 disposed in the driving shaft 60 is rotated. When the first gear 51 is rotated, the third gear 53 may be rotated via the second gear 52 meshed with the first gear 51. The third gear 53 may be disposed in the hinge shaft 40 hinge-connecting the first roller support portion 20 and the second roller support portion 30. The second spring clutch 45 may be provided in the hinge shaft 40. Accordingly, when power is transmitted to the third gear 53, the second roller support portion 30 may be swung integrally with the hinge shaft 40 based on the rotational center C2 of the hinge shaft 40 in a clockwise direction by the second spring clutch 45 disposed in the hinge shaft 40.

Figure 6C:
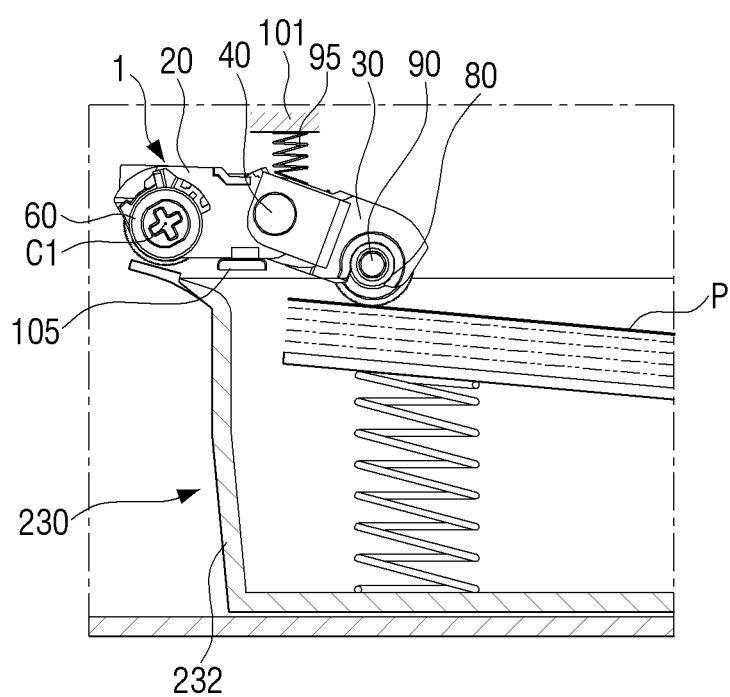
FIG. 6C is a cross-sectional view illustrating an exemplary state in which a pickup roller of the sheet pickup apparatus is in contact with a print medium.
Figure 6D:
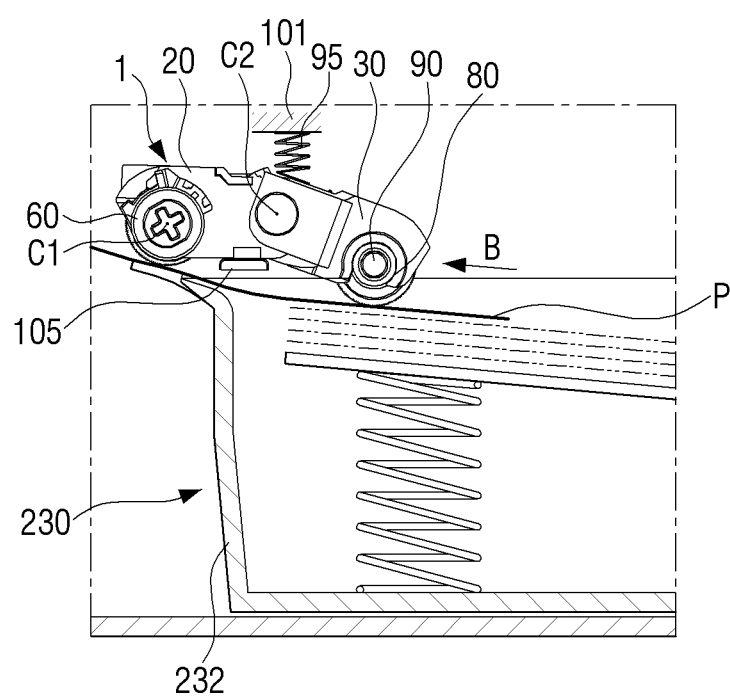
FIG. 6D is a cross-sectional view illustrating an exemplary state in which a print medium is fed by a pickup roller of the sheet pickup apparatus.

When the second roller support portion 30 is rotated by a predetermined angle, as illustrated, for example, in FIG. 6C, the pickup roller 80 of the second roller support portion 30 may hit against the print medium P loaded in the paper feed cassette 232. When the pickup roller 80 of the second roller support portion 30 is hit against the print medium P, a load, for example, greater than a reference load, may applied to the second spring clutch 45 so that the hinge shaft 40 slips with respect to the second roller support portion 30. Accordingly, in a state which the pickup roller 80 is hit against the print medium P, the second roller support portion 30 may be stopped and only the hinge shaft 40 rotates. When the hinge shaft 40 rotates, the third gear 53 of the power transmitting member 50 disposed in the hinge shaft 40 may be rotated so that the fifth gear 55 is rotated via the fourth gear 54 meshed with the third gear 53. Since the fifth gear 55 may be disposed in a shaft 90 of the pickup roller 80, when the fifth gear 55 is rotated, as illustrated, for example, in FIG. 6D, the pickup roller 80 may be rotated so that the print medium P in contact with the pickup roller 80 is conveyed in a direction of an arrow B. Since the feed roller 70 is disposed coaxially in the driving shaft 60, the print medium P picked up by the pickup roller 80 may be conveyed toward the image forming unit 210 by the feed roller 70.

After the feeding of one print medium P is completed, the power being transmitted to the driving shaft 60 may be cut off. As a result, the roller support member 10 may be returned from the paper feeding position as illustrated in FIG. 6D to the original position as illustrated in FIG. 6A by the restoring member 95.

According to an exemplary embodiment, a monochrome laser printer is an example of an image forming apparatus 200 in which the sheet pickup apparatus 1 is used. However, this is only one example, and image forming apparatuses in which the sheet pickup apparatus 1 is used are not limited thereto. The sheet pickup apparatus 1 according to an embodiment of the present disclosure may be used in color laser printers, inkjet printers, copiers, multifunctional products, etc.

Figure 7A:
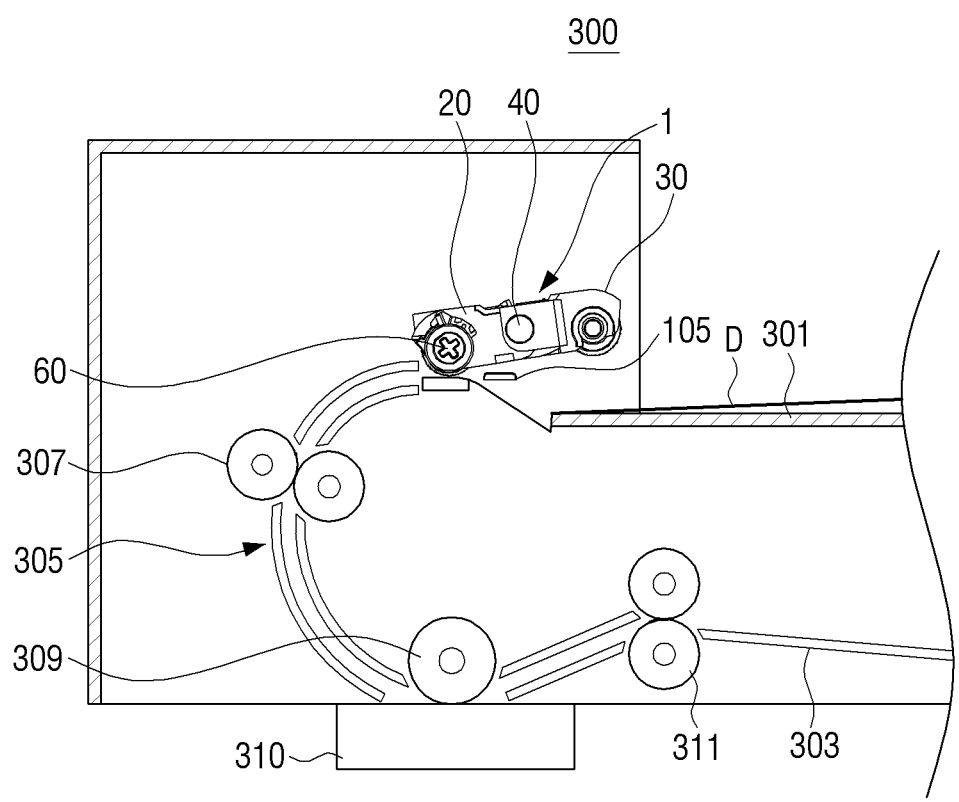
FIG. 7A is a cross-sectional view illustrating an automatic document feeding apparatus in which a sheet pickup apparatus according to an embodiment of the present disclosure is provided.
Figure 7B:
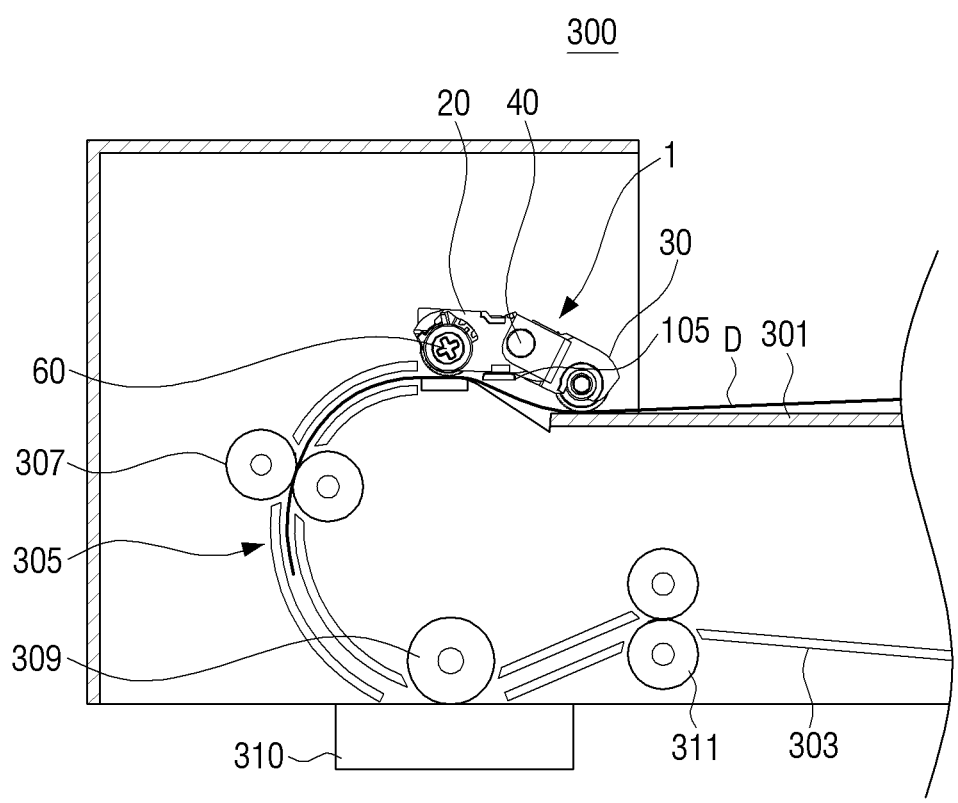
FIG. 7B is a cross-sectional view illustrating an exemplary state in which a document is fed by a pickup roller of the sheet pickup apparatus.

FIGS. 7A and 7B illustrate an exemplary operation of a sheet pickup apparatus according to an embodiment of the present disclosure disposed in an automatic document feeder that is used in a copier.

As illustrated in FIGS. 7A and 7B, the sheet pickup apparatus 1 may be disposed above a paper feeding tray 301 of an automatic document feeder 300 and picks up documents D one by one so as to feed it a document guiding path 305. The document guiding path 305 conveys the document D picked up by the sheet pickup apparatus 1 to a scanning unit 310. The document D passed through the scanning unit 310 may be discharged onto a paper discharging tray 303 by a paper discharging roller 311.

Before feeding the document D, the sheet pickup apparatus 1 may be placed at an original position spaced apart by a predetermined distance from the paper discharging tray 301, as illustrated in FIG. 7A. When a scan operation is started, power may be transmitted from a driving source (not illustrated) to the driving shaft 60 so that the driving shaft 60 is rotated. When the driving shaft 60 is rotated, the roller support member 10 may be rotated integrally with the driving shaft 60 by the first spring clutch 75. When the first roller support portion 20 of the roller support member 10 is hit against the damper member 105, the power of the driving shaft 60 may be transmitted to the hinge shaft 40 by the power transmitting member 50 so that the hinge shaft 40 is rotated. When the hinge shaft 40 is rotated, the second roller support portion 30 may be rotated integrally with the hinge shaft 40 by the second spring clutch 45. When the pickup roller 80 is brought into contact with the document D by the rotation of the second roller support portion 30 by a predetermined angle, as illustrated, for example, in FIG. 7B, only the pickup roller 80 is rotated by the power of the driving shaft 60 so that the document D is conveyed to the document guiding path 305. The document D conveyed to the document guiding path 305 may be conveyed to the scanning unit 310 by a conveying roller 307. The document D conveyed to the scanning unit 310 may be scanned while the document D is passing through between a white roller 309 and the scanning unit 310, and may be conveyed to a paper discharging roller 311. After the document D is discharged onto a paper discharging tray 303 by the paper discharging roller 311, the scanning of the document D may be considered complete.

According to an exemplary embodiment, the sheet pickup apparatus 1 includes two roller support portions 20 and 30 connected by one hinge shaft 40. However, the present disclosure is not limited thereto. A sheet pickup apparatus according to an embodiment of the present disclosure may be configured of three or more roller supporting portions connected by two or more hinges. Spring clutches or torque clutches may be disposed between the driving shaft 60 and roller support member 10 and in each of the hinges. Accordingly, the sheet pickup apparatus having one hinge may be provided with two spring clutches, and a sheet pickup apparatus having two hinges is provided with three spring clutches. Accordingly, a sheet pickup apparatus having n number of hinges may be provided with n+1 of spring clutches.

A sheet pickup apparatus having n number of hinges may be provided with at least one damper member in order to reduce impact noise generated between the pickup roller and the sheet. The at least one damper member may be disposed to limit rotational movement of a roller support portion directly connected to another roller support portion in which the pickup roller is disposed. For example, if a sheet pickup apparatus is provided with n number of roller support portions and a roller support portion in which the pickup roller is disposed is referred to as n-th roller support portion from a first roller support portion in which a driving shaft is disposed, the at least one damper member is disposed to limit rotational movement of n−1-th roller support portion. The number of damper members may be disposed, e.g., maximally disposed with the same number of hinges. For example, a sheet pickup apparatus having two hinges may be maximally provided with two damper members.

Figure 8A:
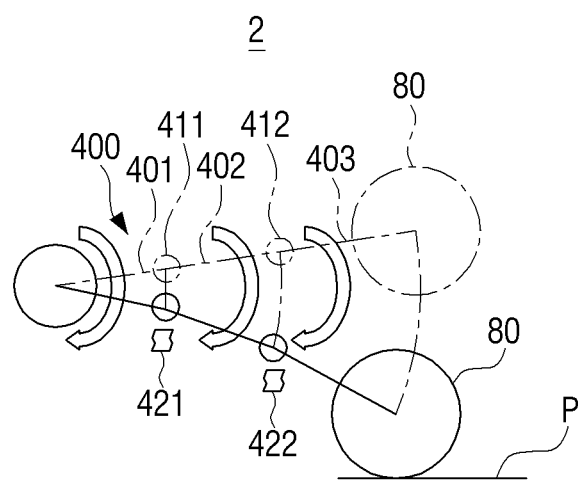
FIGS. 8A, 8B, and 8C illustrate various exemplary installation positions of damper members in a sheet pickup apparatus having three roller supporting portions.
Figure 8B:
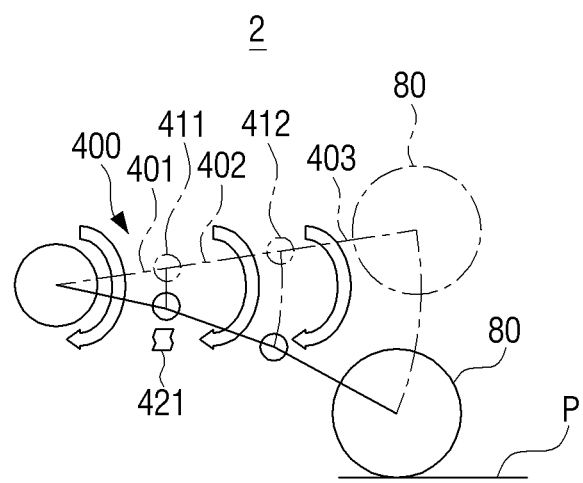
Figure 8C:
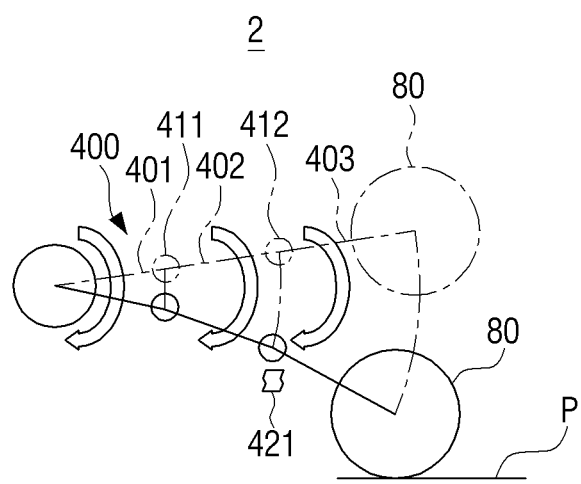

A sheet pickup apparatus including a roller support member having three roller support portions connected by two hinges, installation positions of damper members is described, for example, as illustrated in FIGS. 8A, 8B, and 8C.

FIGS. 8A, 8B, and 8C illustrate various exemplary installation positions of damper members in a sheet pickup apparatus having three roller supporting portions.

A sheet pickup apparatus 2 including a roller support member 400 including three roller support portions 401, 402, and 403, namely, a first roller support portion 401 in which a driving shaft 60 may be disposed, a second roller support portion 402 connected to the first roller support portion 401 by a first hinge 411, and a third roller support portion 403 that may connected to the second roller support portion 402 by a second hinge 412 and rotatably supports a pickup roller 80 may be provided, e.g., maximally provided with two damper members 421 and 422. As illustrated in FIG. 8A, each of the damper members 421 and 422 may be disposed at a position to limit rotational movement of each of the first roller support portion 401 and the second roller support portion 402.

As another example, a roller support member 400 including three roller support portions 401, 402, and 403 may be configured so that a single damper member 421 absorbs the impact of the roller support member 400. As illustrated in FIG. 8B, the single damper member 421 may be disposed to limit the rotational movement of the first roller support portion 401. Alternatively, as illustrated in FIG. 8C, the single damper member 421 may be disposed to limit the rotational movement of the second roller support portion 402. In order to maximize the impact absorbing effect of the damper member 421, the damper member 421 may be disposed at a position to limit the rotational movement of the second roller support portion 402 as illustrated in FIG. 8C. If a roller support member includes four or more roller support portions, a damper member may be disposed at a position to limit rotational movement of a roller support portion just before a roller support portion in which a pickup roller is disposed.

In the sheet pickup apparatus 1 for an image forming apparatus according to an embodiment of the present disclosure, after the damper member 105 first absorbs the kinetic energy of a roller support member in which a pickup roller 80 is disposed, the pickup roller 80 may be hit against a print medium so that an impact energy with which the pickup roller 80 is hit against the print medium is reduced compared to that of the conventional sheet pickup apparatus. Accordingly, with the sheet pickup apparatus according to an embodiment of the present disclosure, impact noise may be reduced.

The inventor experimented with comparing noise generated when a conventional sheet pickup apparatus and a sheet pickup apparatus according to an embodiment of the present disclosure picks up a print medium.

Figure 9A:
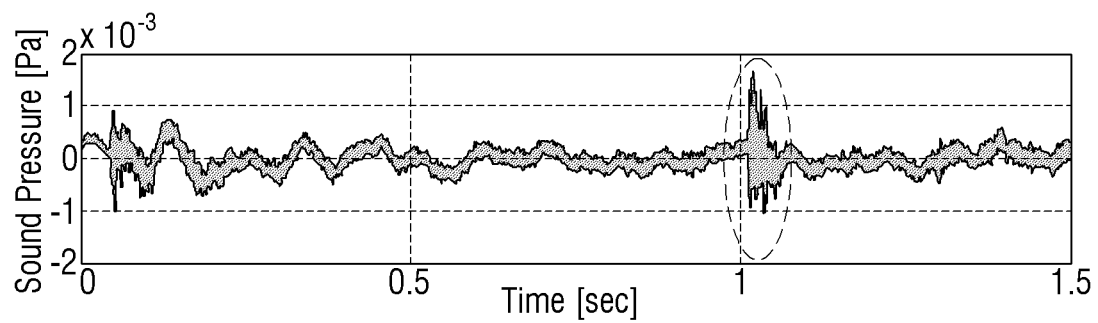
FIG. 9A is a graph illustrating exemplary impact noise generated when a conventional sheet pickup apparatus for an image forming apparatus picks up a print medium.
Figure 9B:
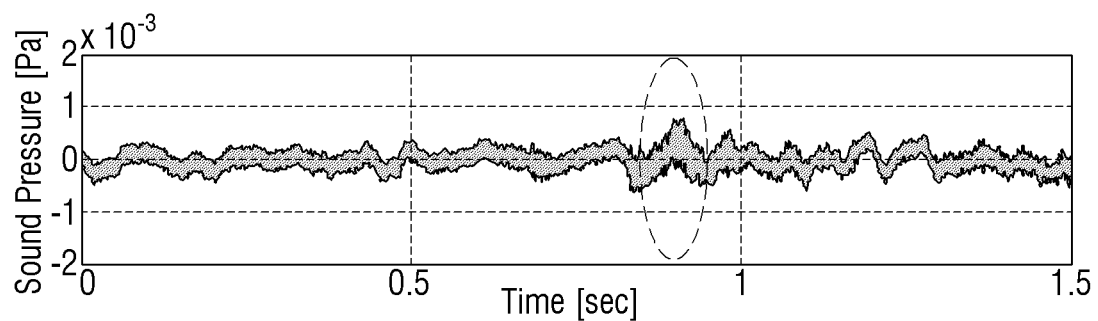
FIG. 9B is a graph illustrating exemplary impact noise generated when a sheet pickup apparatus for an image forming apparatus according to an embodiment of the present disclosure picks up a print medium.

An exemplary result of the experiment is illustrated in FIGS. 9A and 9B. FIG. 9A is a graph illustrating exemplary impact noise generated when a conventional sheet pickup apparatus for an image forming apparatus picks up a print medium, and FIG. 9B is a graph illustrating exemplary impact noise generated when a sheet pickup apparatus for an image forming apparatus according to an embodiment of the present disclosure picks up a print medium.

In the graphs of FIGS. 9A and 9B, the X-axis represents time (sec), and the Y-axis represents sound pressure (Pa). Noise measurement was conducted in a hemi-anechoic room. An amount of air pressure generated during printing of one print medium was measured at 1 m of distance in front of the image forming apparatus by using a microphone. In FIGS. 9A and 9B, a portion surrounded by a dotted line represents impact noise generated when the pickup roller is brought into contact with a print medium of a sheet feeding unit. As illustrated in FIG. 9A, when the conventional sheet pickup apparatus picks up a print medium, a sound pressure representing pickup impact is $1.6 \times 10^{-3}$ Pa. As illustrated in FIG. 9B, when the sheet pickup apparatus according to an embodiment of the present disclosure picks up a print medium, a sound pressure representing the pickup impact is $0.8 \times 10^{-3}$ Pa, e.g., so that the impact noise is reduced by approximately half compared to the conventional sheet pickup apparatus.

While the embodiments of the present disclosure have been described, additional variations and modifications of the embodiments may occur to those skilled in the art after review of the disclosure. Therefore, it is intended that the appended claims shall be construed to include both the above embodiments and all such variations and modifications that fall within the spirit and scope of the inventive concepts.

What is claimed is:

1. A sheet pickup apparatus, which is disposed in a sheet feeding unit of an image forming apparatus, the sheet pickup apparatus comprising:
    a roller support member rotatably disposed in the sheet feeding unit, the roller support member comprising at least two roller support portions connected by at least one hinge;
    a driving shaft rotatably disposed in one end of the roller support member connected in the sheet feeding unit, the driving shaft to transmit rotational force to the roller support member;
    a pickup roller rotatably disposed in another end of the roller support member;
    a damper member disposed to absorb impact force by limiting rotation of the roller support member; and
    a power transmitting member disposed in the roller support member, the power transmitting member to transmit the rotational force of the driving shaft to the pickup roller,
    wherein, when the driving shaft receives the rotational force from a driving source of the sheet feeding unit, the roller support member is rotated to hit against the damper member, and then a roller support portion in which the pickup roller is disposed is rotated so that the pickup roller is brought into contact with a sheet loaded in the sheet feeding unit and picks up the sheet.

2. The sheet pickup apparatus of claim 1, further comprising:
    a spring clutch or a torque clutch respectively disposed between the driving shaft and the roller support member and in the at least one hinge.

3. The sheet pickup apparatus of claim 1, wherein a friction force by which the driving shaft can swing the roller support member exists between the roller support member and the driving shaft.

4. The sheet pickup apparatus of claim 3, wherein a friction force that can swing a roller support portion in which the pickup roller is disposed by the rotational force transmitted from the driving shaft exists in a hinge connected to the roller support portion in which the pickup roller is disposed.

5. The sheet pickup apparatus of claim 1 further comprising:
    a moving clutch disposed between the pickup roller and the power transmitting member.

6. The sheet pickup apparatus of claim 1 further comprising:
    a restoring member to return the roller support member to an original position.

7. The sheet pickup apparatus of claim 1 further comprising:
    a feed roller disposed rotatably and coaxially in the driving shaft.

8. The sheet pickup apparatus of claim 7, wherein
    a moving clutch is disposed between the driving shaft and the feed roller.

9. The sheet pickup apparatus of claim 1, wherein
    the roller support member comprises:
        a first roller support portion having one end in which the driving shaft is rotatably disposed, and a second roller support portion having one end connected to the first roller support portion by the at least one hinge and another end in which the pickup roller is rotatably disposed.

10. The sheet pickup apparatus of claim 1, wherein the damper member is disposed in a fixing bracket extending from a frame of the sheet feeding unit.

11. The sheet pickup apparatus of claim 10, wherein the damper member comprises rubber and sponges.

12. An image forming apparatus comprising:
a sheet feeding unit disposed in a main body and storing sheets;
a sheet pickup apparatus disposed in the sheet feeding unit, the sheet pickup apparatus to pick up and supply the sheets one by one; and
an image forming unit to form an image on a sheet which is picked up and supplied by the sheet pickup apparatus,
wherein the sheet pickup apparatus comprises:
 a roller support member rotatably disposed in the sheet feeding unit, the roller support member comprising at least two roller support portions connected by at least one hinge,
 a driving shaft rotatably disposed in one end of the roller support member connected to the sheet feeding unit, the driving shaft to transmit rotational force to the roller support member,
 a pickup roller rotatably disposed in another end of the roller support member;
 a damper member disposed to absorb impact force by limiting rotation of the roller support member, and
 a power transmitting member disposed in the roller support member, the power transmitting member to transmit the rotational force of the driving shaft to the pickup roller,
wherein, when the driving shaft receives rotational force from a driving source of the sheet feeding unit, the roller support member is rotated to hit against the damper member, and then a roller support portion in which the pickup roller is disposed is rotated so that the pickup roller is brought into contact with a sheet loaded in the sheet feeding unit and picks up the sheet.

13. The image forming apparatus of claim 12, further comprising:
a spring clutch or a torque clutch respectively disposed between the driving shaft and the roller support member and in the at least one hinge.

14. The image forming apparatus of claim 12 further comprising:
a moving clutch disposed between the pickup roller and the power transmitting member.

15. The image forming apparatus of claim 12 further comprising:
a restoring member to return the roller support member to an original position.

16. The image forming apparatus of claim 12 further comprising:
a feed roller disposed rotatably and coaxially in the driving shaft.

17. The image forming apparatus of claim 16, wherein a moving clutch is disposed between the driving shaft and the feed roller.

18. The image forming apparatus of claim 12, wherein the roller support member comprises:
 a first roller support portion having one end in which the driving shaft is rotatably disposed, and
 a second roller support portion having one end connected to the first roller support portion by the at least one hinge and another end in which the pickup roller is rotatably disposed.

19. The image forming apparatus of claim 12, wherein the damper member is disposed in a fixing bracket extending from a frame of the sheet feeding unit.

* * * * *